United States Patent [19]
Kinoshita et al.

[11] Patent Number: 6,023,839
[45] Date of Patent: Feb. 15, 2000

[54] DISK DRIVE MOTOR, AND METHOD OF MANUFACTURING ITS ROTOR

[75] Inventors: Shinji Kinoshita; Shinji Ohta; Mitsuru Ide, all of Nagano, Japan

[73] Assignee: Kabushiki Kaisha Sankyo Seiki Seisakusho, Nagano, Japan

[21] Appl. No.: 08/883,703

[22] Filed: Jun. 27, 1997

[30] Foreign Application Priority Data

Jun. 28, 1996 [JP] Japan .................................. 8-169238

[51] Int. Cl.⁷ ........................... H02K 15/02; H02K 7/00; H02K 1/22; G11B 17/04
[52] U.S. Cl. ......................... 29/598; 310/67 R; 310/156; 310/267; 360/98.07
[58] Field of Search .................. 29/598, 607; 310/67 R, 310/90, 89, 156, 267, 42; 360/98.07, 99.04, 98.08

[56] References Cited

U.S. PATENT DOCUMENTS

| | | | |
|---|---|---|---|
| 4,519,010 | 5/1985 | Elsaesser et al. | 360/97 |
| 4,795,924 | 1/1989 | Kamiyama et al. | 310/67 R |
| 5,517,374 | 5/1996 | Katakura et al. | 360/28.07 |
| 5,528,092 | 6/1996 | Ohta | 310/67 R |
| 5,633,769 | 5/1997 | Kinoshita et al. | 360/99.08 |

Primary Examiner—Nestor Ramirez
Assistant Examiner—Dang Dinh Le
Attorney, Agent, or Firm—Sughrue, Mion, Zinn, MacPeak & Seas, PLLC

[57] ABSTRACT

A motor rotor 10 is formed as follows: First, in a first forging step, a hum manufacturing primary block 6A is formed. Next, a second forging step B is effected to form the primary blank 6A into a secondary blank 6B. In this step, a forging die is used to secure an annular yoke 34 to the inner cylindrical surface 61a of a hub cylindrical portion 61 by punching, in such a manner that both whole edges of the annular yoke are sealingly closed thereby. In the second forging step B, by drawing the inner cylindrical surface 34a of the annular yoke, its circularity is improved. The annular yoke can be secured to the hub cylindrical portion with use of an adhesive agent. Moreover, the annular yoke can be fixed in such a manner that it is accurately coaxial with the hub cylindrical portion. In addition, the gap between the annular yoke and the hub cylindrical portion can be eliminated.

5 Claims, 4 Drawing Sheets

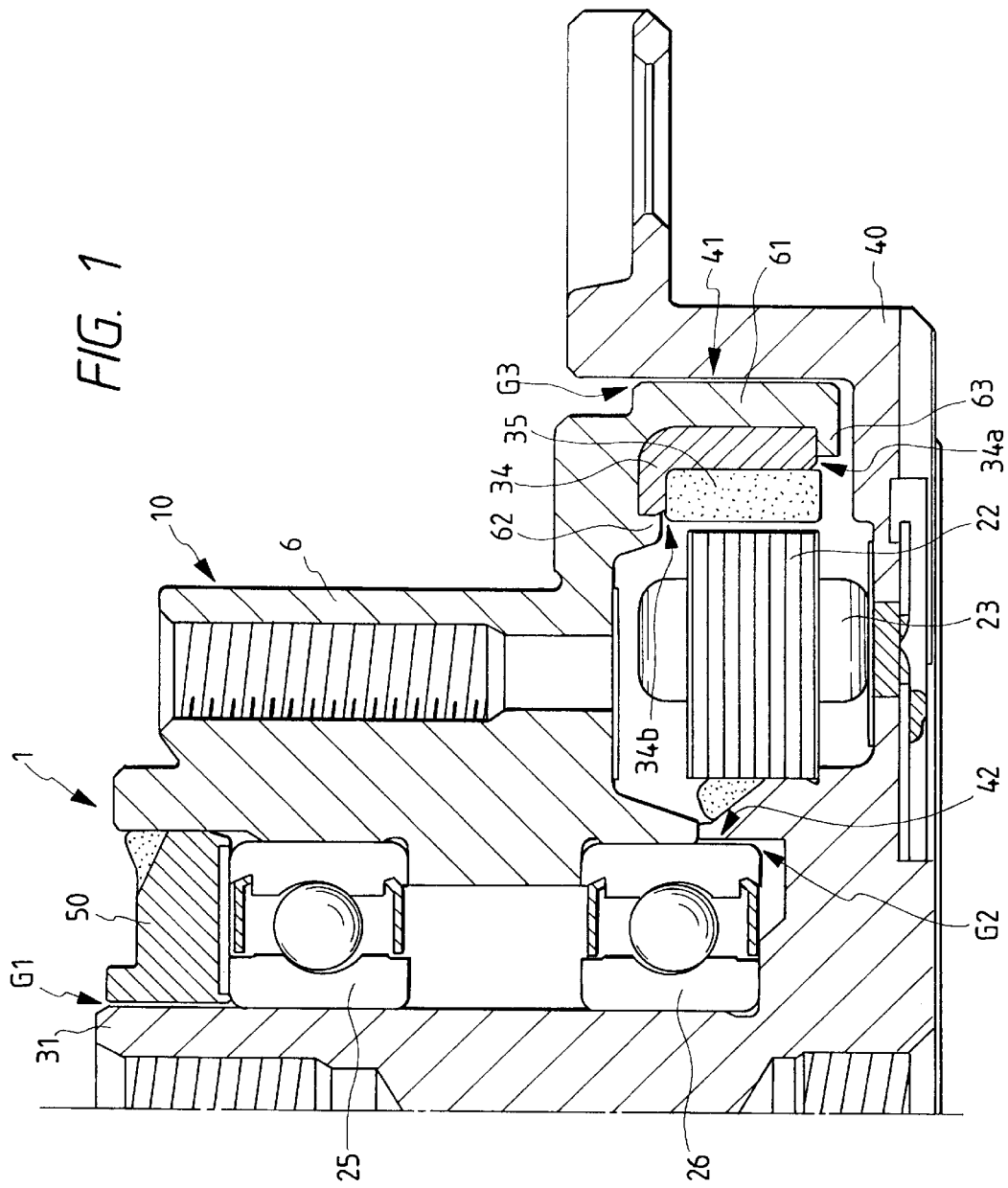

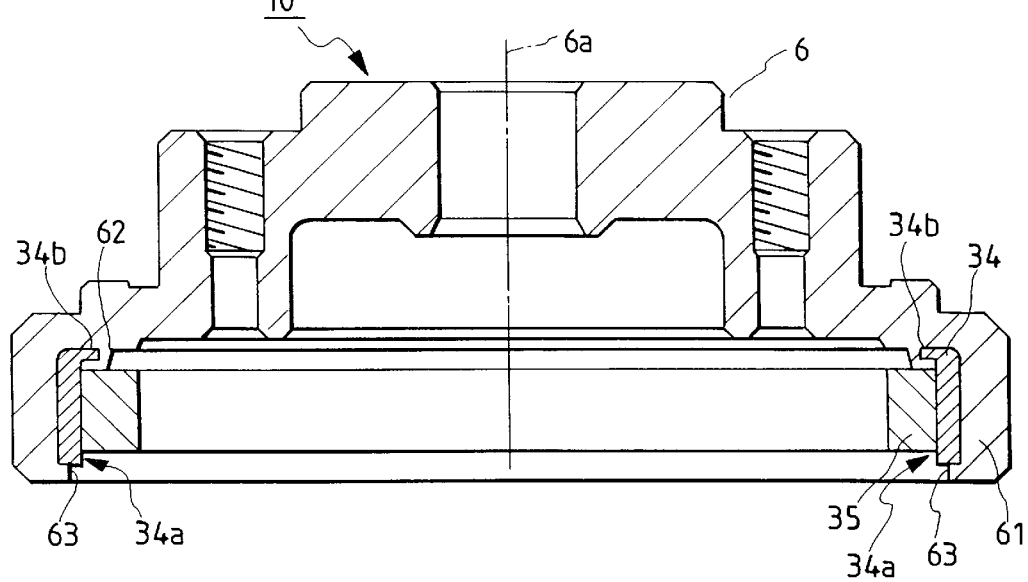
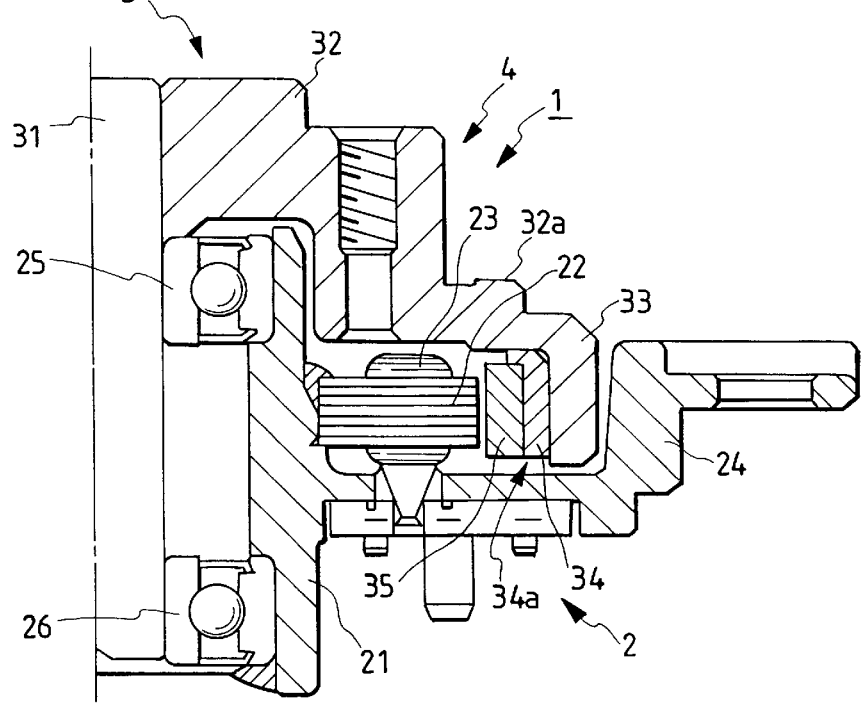

DISK DRIVE MOTOR, AND METHOD OF MANUFACTURING ITS ROTOR

BACKGROUND OF THE INVENTION

1. Field of the Invention

This invention relates to a disk drive motor employed in a disk drive device adapted to turn an optical disk or the like, and more particularly to a motor rotor which is integral with a disk mounting hub which is built in the disk drive motor, and a method of manufacturing the motor rotor.

2. Related Art

A disk drive device has a disk mounting hub which is rotatable with respect to the device body, and it is so designed that the disk drive motor rotates the hub, so that a disk mounted on the hub is turned.

FIG. 5 shows a disk drive motor which is generally used. As shown in FIG. 5, a disk drive motor 1 comprises a stator assembly 2 secured to the device body, and a rotor assembly 3 which is supported in such a manner that it is rotatable with respect to the device body.

The stator assembly 2 includes: a cylindrical bearing holder 21; a stator core 22 fixedly mounted on the outer cylindrical surface of the bearing holder 21 in such a manner the stator core 22 is coaxial with the bearing holder 21; a drive coil 23 which is wound on a plurality of protruded poles of the stator core 22. A plate-shaped frame 24 are radially outwardly extended from the bearing holder 21, and the frame 24 is secured to the device body with fixing screws.

The rotor assembly 3 includes: a rotary shaft 31 which is rotatably supported through a pair of ball bearings 25 and 26 on the inner cylindrical surface of the bearing holder 21; and a cylindrical disk mounting hub 32 which is secured to the end the rotary shaft 31. The hub 32 includes an annular-yoke-mounting cylindrical portion 33. An annular yoke of magnetic material is fixedly secured to the inner cylindrical surface 33a of the cylindrical portion 33. An annular drive magnet 35 is fixedly secured to the inner cylindrical surface of the annular yoke 34. The drive magnet 35 coaxially surrounds the stator core 22 in such a manner that there is a slight gap between the annular drive magnet 35 and the stator core 22.

The hub 32 has an annular stepped surface 32a, on which a disk is placed (mounted). A plurality of disks (not shown) are stacked through a spacer on the stepped surface 32a, and all of the disks thus stacked are clamped onto the hub 32 with a damper (not shown).

The hub 32, the annular yoke 34, and the drive magnet 35 form a motor rotor 4. The motor rotor 4 is manufactured as follows:

As shown in FIG. 4, first of all, non-magnetic metal material such as aluminum is subjected to die forging, to form a hub manufacturing primary blank 32A. The primary blank 32A is subjected to die forging again, to form a secondary blank which is almost similar to the final product, namely, the aimed hub. The secondary blank is subjected to finishing twice, to obtain the final product, namely, the aimed hub. On the other hand, a magnetic metal plate is subjected to pressing, to form the annular yoke 34.

The annular yoke 34 thus formed is inserted into the cylindrical portion 33 of the hub through the opening, and then the annular yoke 34 is bonded to the inner cylindrical surface of the cylindrical portion 33 with an adhesive agent. Thereafter, the drive magnet 35 is inserted into the annular yoke 34, and then the drive magnet 35 is fixedly bonded to the cylindrical surface of the annular yoke 34 with an adhesive agent. As a result, a motor rotor 4 is obtained in which the annular yoke 33 and the drive magnet 34 are fixedly secured to the hub 32. A motor rotor which is similar to that which has been described above has been disclosed by U.S. Pat. No. 5,517,374.

On the other hand, a method is also known in the art in which, after the hub 3, the final product, has been obtained, the annular yoke 34 is secured to the hub 32 without use of the adhesive agent. That is, in the method, the annular yoke 34 is inserted into the hub 32, and then the annular yoke 34 is fixedly secured to the hub 32 by punching.

As was described above, the yoke 34 is bonded to the hub 32 with an adhesive agent. This method suffers from the following problems:

A first problem is as follows: A clearance (gap) must be provided between the inner cylindrical surface of the cylindrical portion of the hub 32 and the outer cylindrical surface of the yoke 34, and the clearance thus provided must be filled with the adhesive agent. Because of the clearance, when the yoke 34 is bonded to the cylindrical portion of the hub, the central axis of the hub cylindrical portion 33 may be shifted from the central axis of the yoke. If this shift occurs, the motor rotor becomes poor in the balance of rotation; that is, the run-out due to rotation is increased. This makes it difficult to increase the density of data of the disk.

A second problem attributes to the employment of the adhesive agent. That is, when the adhesive agent is not completely solidified yet, it may scatter as gas, which may stick onto the recording surface of the disk.

A third problem is as follows: The annular end face 34a of the yoke 34 is exposed in the opening of the hub cylindrical portion 33. Therefore, cutting oil, cleaning oil, etc. used in the finishing work may enter the space between the inner cylindrical surface of the cylindrical portion and the outer cylindrical surface of the yoke through the end face 34a and stay therein. Hence, during the operation of the motor, a liquid such as cutting oil and cleaning oil oozes out, thus sticking onto the recording surface of the disk.

On the other hand, the method in which the hub is secured to the annular yoke by punching suffers from the following problems. That is, the hub, which is the final product which has been finished by machining, is subjected to punching. Hence, the hub may be distorted by the punching stress. If the hub is distorted, then the hub becomes poor in the balance of rotation, and therefore it is necessary to use a balancer to adjust the balance of rotation.

SUMMARY OF THE INVENTION

An object of the invention is to eliminate the above-described difficulties accompanying a conventional disk drive motor.

An aspect of the present invention, there is provided a method of manufacturing a motor rotor in which an annular yoke is fitted in a cylindrical portion of a hub in the direction of axis, and a drive magnet is fitted in said yoke along the inner cylindrical surface in the direction of axis, comprising the steps of: processing a die forging for a non-magnetic metal material to form a hub manufacturing primary blank which has said cylindrical portion, and first and second punching portions which are annular and with which both whole edges of said yoke fitted in the inner cylindrical surface of said cylindrical portion can be punched; and processing a die forging for said primary blank to form a hub manufacturing secondary blank which is substantially similar to a final product, wherein, in said second forging step, with said yoke inserted into said cylindrical portion, said first and second punching portions are crushed with a forging die to fix said yoke by punching in such a manner that both whole edges of said yoke are sealingly closed thereby.

Another aspect of the present invention, there is provided a disk drive motor comprising: a shaft; a rotor rotatably mounted on said shaft, said rotor having a disk hub, and a cylindrical portion having an opening at one end thereof, the inner cylindrical surface of said cylindrical portion on which an annular yoke is fixedly fitted, said annular yoke being inserted into said cylindrical portion of said rotor through the opening thereof, the front whole end thereof, in the direction of insertion, being fixed to said rotor by punching, while the rear whole end thereof, in the direction of insertion, being fixed to said rotor by punching; and a frame supporting said shaft.

As was described above, in the invention, in forming the hub-manufacturing blank by die forging, the forging die is used so that the annular yoke is fixed by punching in such a manner that, with respect to the inner cylindrical surface of the cylindrical portion of the hub manufacturing blank, both whole edges of the annular yoke are sealingly covered therewith.

That is, the annular yoke is secured to the inner cylindrical surface of the hub without use of an adhesive agent. This feature eliminates the difficulty that, when the motor including the motor rotor is used, the adhesive agent not solidified yet becomes harmful gas.

Both whole edges of the annular yoke are sealingly closed with the first and second punching portions, respectively. Hence, the motor of the invention is free from the difficulty that cutting oil, cleaning solution, etc. enters the space between the annular yoke and the hub cylindrical portion. Even if cutting oil, cleaning solution, etc. enters the space, they may not flow out of it.

Furthermore, in the invention, the annular yoke is secured to the hub cylindrical portion in such a manner that the annular yoke is coaxial with the hub cylindrical portion with high accuracy. Hence, the resultant motor rotor is excellent in the balance of rotation.

Moreover, in the invention, the inner cylindrical surface of the annular yoke is forcibly pressed with the forging die, so that the annular yoke is improved in circularity. Hence, the gap between the annular yoke and the hub cylindrical portion can be completely eliminated, and therefore the resultant motor rotor is improved in the balance of rotation. Furthermore, with the inner cylindrical surface of the annular yoke high in circularity as a reference surface, the machining operation is carried out. Hence, the hub manufacturing blank can be machined with high accuracy.

In addition, according to the manufacturing method of the invention, after the annular yoke is fitted in the hub by punching in the second forging step, the hub is finished. Accordingly, even if the hub is distorted when the annular yoke is fitted in the hub by punching, the distortion can be eliminated in the finishing step. Hence, in the manufacturing method, unlike the conventional one, it is unnecessary to provide the step of eliminating or correcting the distortion of the hub.

BRIEF DESCRIPTION OF THE DRAWINGS

FIG. 1 is a half of a sectional view showing a disk drive motor to which a motor rotor manufactured according to a method of invention is applicable;

FIG. 2 is sectional view showing said motor rotor which is manufactured according to the method of the invention;

FIG. 5 is a diagram showing a conventional motor.

DETAILED DESCRIPTION OF THE PREFERRED EMBODIMENTS

Figure 3:
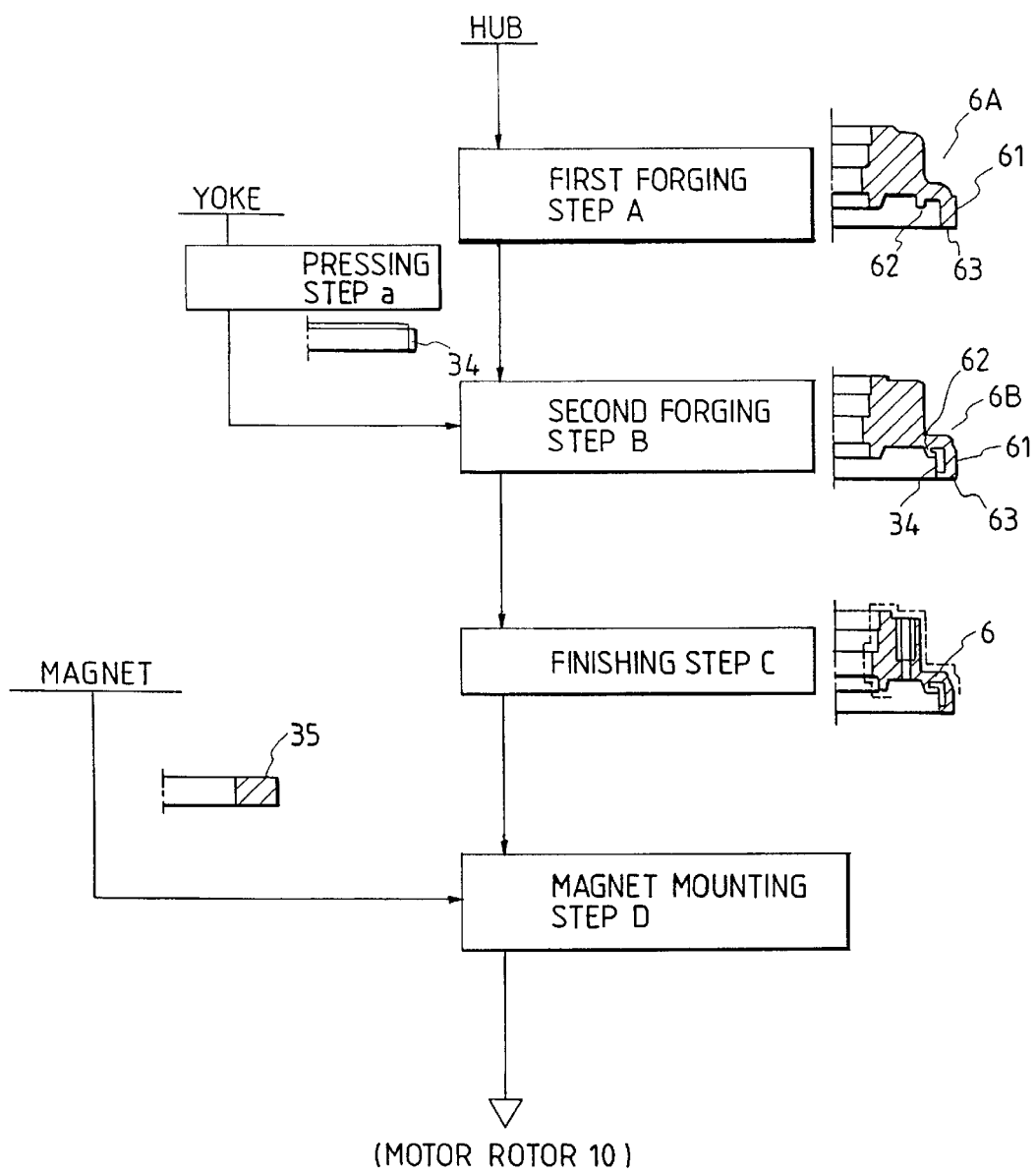
FIG. 3 is a diagram showing manufacturing steps in the method of the invention.
Figure 4:
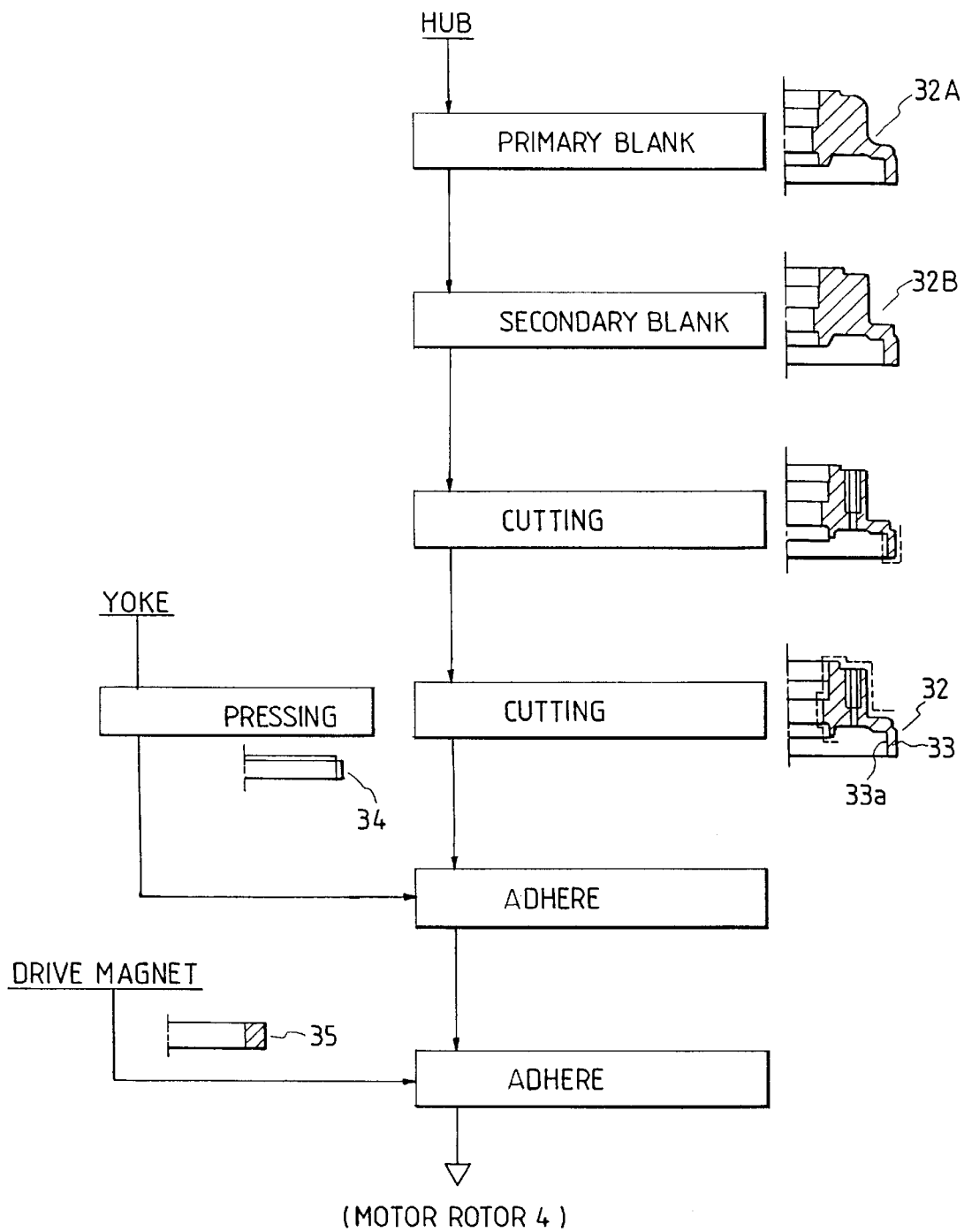
FIG. 4 is a diagram showing steps of manufacturing a conventional motor rotor.

The structure of a motor according to the invention, and a method of manufacturing the motor will be described with reference to the accompanying drawings.

FIG. 1 shows a disk drive motor equipped with a rotor which is formed according to a manufacturing method of the invention.

As shown in FIG. 1, ball bearings 25 and 26 are fixedly mounted on a shaft 31. A rotor 10 is rotatably supported by the ball bearings 25 and 26. The rotor 10 comprises: a disk hub 6 on which a disk is fixedly set; and a cylindrical portion 61 which is extended in the direction which is opposite to the direction in which the disk hub 6 is extended. The cylindrical portion 61 has an opening at the end.

The whole circular edge of the inner cylindrical surface of the cylindrical portion 61 is formed into a first punching portion 62, and the whole circular edge of the opening of the cylindrical portion 61 is formed into a second punching portion 63. An annular yoke 34 is inserted into the cylindrical portion 61. The first and second punching portions are punched to fix the front and rear portions of an annular yoke, as viewed in the direction of insertion. A ring-shaped rotor magnet is bonded to the yoke 34.

Between the shaft 31 and the rotor 10, a first labyrinth is formed with a small gap G1 between the shaft 31 and a labyrinth ring 50 secured to the rotor. The outer cylindrical surface of the lower ball bearing 26 mounted on the shaft 31 forms a second labyrinth with a small gap G2 between the outer cylindrical surface of the lower ball bearing 26 and a first wall surface of a frame 40.

The frame 40 includes the shaft 31, and a stator core 22 on which a coil 23 is wound. The frame 40 has a second wall surface 41 which is confronted with the outer cylindrical surface of the cylindrical portion 61 of the rotor 6. The outer cylindrical surface of the cylindrical portion 61 is machined with high accuracy with the inner cylindrical surface of the yoke 34 as a reference surface, and forms a third labyrinth with a small gap G3 between the outer cylindrical surface of the cylindrical portion 61 and the second wall surface 41 of the frame 40.

In the motor of the invention, the yoke 34 is fixedly secured to the cylindrical portion 61 of the rotor 6 by punching the whole circular edges thereof. Owing to this feature, in the rotor, the center of rotation is less shifted. Furthermore, the outer cylindrical surface of the cylindrical portion is finished with high accuracy with the inner cylindrical surface of the yoke as a reference surface. Therefore, the gap between the outer cylindrical surface of the cylindrical portion 61 and the wall surface 41 of the frame 40 is considerably small; that is, an excellent labyrinth structure is formed. This labyrinth structure cooperates with the first and second labyrinths to block the path through which the inside is communicated with the outside; that is, oil, dust, etc in the motor is positively prevented from flowing out of the later (motor).

FIG. 2 shows a motor rotor 10 which is formed according to a manufacturing method of the invention. The motor rotor is applicable to the disk drive motor shown in FIG. 1.

As shown in FIG. 2, the motor rotor 10 comprises: a cylindrical hub 6 having a cylindrical portion 61; an annular yoke 34 which is inserted into the cylindrical portion 61 of the hub 6 in the direction of the central axis 6a; and an annular drive magnet 35 which is inserted into the annular yoke 34 in the direction of the central axis 6a.

When a hub manufacturing blank is processed by die forging, the annular yoke 34 of the motor rotor 10 is inserted into the blank, and fixed by punching.

The space between the outer cylindrical surface of the annular yoke 34 and the inner cylindrical surface of the hub cylindrical portion 61 is sealingly closed by the first and second punching portions which have been clasped when the hub manufacturing blank is processed by die forging.

The annular end face which is continuous with the inner cylindrical surface of the hub cylindrical portion 61 has the first punching portion 62 which is protruded therefrom. The first punching portion 62 is clasped by die forging, so that the annular yoke 34 is fixed to the hub cylindrical portion in such a manner that the whole annular gap between the end face of the hub 6 and the outer cylindrical surface of the annular yoke 34 is completely closed.

Similarly, the inner edge of the opening of the hub cylindrical portion 61 is clasped by die forging, so that the annular yoke 34 is fixed to the hub cylindrical portion in such a manner that the whole annular gap between the inner cylindrical surface of the hub cylindrical portion and the outer cylindrical surface of the annular yoke 34 is completely closed.

As was described above, with the aid of the first punching portion 62, and the second punching portion 63 which is the inner edge of the opening of the hub cylindrical portion, the gap between the inner cylindrical surface of the hub cylindrical portion and the outer cylindrical surface of the annular yoke is closed in its entirety. Hence, no cutting oil, cleaning liquid, etc. will enter the gap between the inner cylindrical surface of the hub cylindrical portion and the outer cylindrical surfaces.

The annular drive magnet 35 may be bonded to the inner cylindrical surface of the annular yoke with an adhesive agent, or according to other methods.

Now, the manufacture of the motor rotor thus constructed will be described with reference to FIG. 3.

First, a hub-manufacturing non-magnetic metal material such as an aluminum material is prepared. The non-magnetic metal material is processed by die forging (a first forging step A). In the first forging step A, the cylindrical portion 61 is formed. At the same time, the first and second punching portions 62 and 63 are formed which are to fix both edges of the annular yoke 34 by punching. The inner edge of the opening of the cylindrical portion 61 serves as the second punching portion 63 (described later). That is, in the first forging step A, a hub-manufacturing primary blank 6A is formed.

On the other hand, the annular yoke 34 is manufactured by pressing a magnetic plate such as an iron plate.

Next, the primary blank formed in the first forging step A is further subjected to forging, to form a hub-manufacturing secondary blank 6B which is substantially similar to the final product (a second forging step B).

In the second forging step B, the annular yoke 34 is, for instance, manually fitted in the cylindrical portion 61. Thereafter, a forging die is used so that the first and second punching 62 and 63 are clasped; that is, the annular yoke 34 is fixed by punching so that both edges of the annular yoke 34 are sealingly covered thereby.

In the second forging step B, the circularity of the inner cylindrical surface of the annular yoke 34, which is fixedly fitted in the inner cylindrical surface of the cylindrical portion 61 by punching, is improved. That is, the cylindrical portion (or punch) of the forging die is strongly pushed, thereby to improve the circularity of the inner cylindrical surface of the annular yoke 34. By sizing the inner cylindrical surface of the annular yoke with the forging die in the above-described manner, the circularity of the inner cylindrical surface of the annular yoke is improved in accuracy to plus or minus five microns. In general, in the case where an annular yoke (34) is formed by pressing, its dimension fluctuates in a range of plus or minus thirty microns. Hence, by sizing the inner cylindrical surface of the annular yoke in the above-described manner, its circularity is markedly improved.

In addition, by sizing the inner cylindrical surface of the annular yoke 34 in the above-described manner, the gap between the inner cylindrical surface of the hub cylindrical portion 61 and the outer cylindrical surface of the yoke may be eliminated; that is, the yoke 34 is accurately coaxial with the hub cylindrical portion 61. Therefore, the resultant motor rotor 10 is excellent in the balance of rotation. Hence, it is unnecessary to adjust the balance of rotation of the motor rotor 10, or the adjustment of the balance of rotation of the motor rotor 10 can be achieved with ease.

Thereafter, the secondary blank 6B formed in the second forging step B is subjected to finishing, to obtain a hub 6 whose configuration is of the final product (a finishing step C). It should be noted that, in this case, the annular yoke 34 has been fitted in the hub 6 by punching.

As was described above, in the second forging step B, the inner cylindrical surface of the annular yoke has been improved in circularity. Hence, in the finishing step C, the secondary blank 6B can be machined with the yoke inner cylindrical surface as a reference surface; that is, by holding the yoke inner cylindrical surface with a chuck, the secondary blank 6b can be automatically positioned in place.

Both whole edges of the annular yoke 34 are sealingly covered with the first and second punching portions 62 and 63, respectively. This feature positively prevents the cutting oil, cleaning oil, etc. which are used in the finishing step C from entering the space between the yoke 34 and the hub cylindrical portion 61.

The punching operation in the second forging step may distort the hub. However, this distortion is eliminated in the finishing step which is effected immediately after the second forging step. Hence, it is unnecessary to provide a step of eliminating the distortion of the hub.

As was described above, the yoke inner cylindrical surface can be employed as a reference surface. Therefore, if the yoke inside diameter is the same, then in the case of machining a hub different in external configuration, no set-up change is necessary, or a set-up change can be achieved with ease. Thus, the manufacturing steps can be markedly simplified.

In the next step; that is, in a magnet mounting step D, the drive magnet 35 is fixedly fitted in the inner cylindrical surface 34a of the annular yoke 34 of the hub 6 thus formed. The drive magnet 35 may be fitted in the annular yoke by using an adhesive agent, by press-fitting, or according to other suitable methods. In the magnet mounting step D, too, since the yoke inner cylindrical surface 34a is high in circularity, the drive magnet 35 can be fitted in the annular yoke 34 with high accuracy.

As was described above, in the invention, in forming the hub-manufacturing blank by die forging, the forging die is used so that the annular yoke is fixed by punching in such a manner that, with respect to the inner cylindrical surface of the cylindrical portion of the hub manufacturing blank, both whole edges of the annular yoke are sealingly covered therewith.

That is, the annular yoke is secured to the inner cylindrical surface of the hub without use of an adhesive agent. This feature eliminates the difficulty that, when the motor including the motor rotor is used, the adhesive agent not solidified yet becomes harmful gas.

Both whole edges of the annular yoke are sealingly closed with the first and second punching portions, respectively. Hence, the motor of the invention is free from the difficulty that cutting oil, cleaning solution, etc. enters the space between the annular yoke and the hub cylindrical portion. Even if cutting oil, cleaning solution, etc. enters the space, they may not flow out of it.

Furthermore, in the invention, the annular yoke is secured to the hub cylindrical portion in such a manner that the annular yoke is coaxial with the hub cylindrical portion with high accuracy. Hence, the resultant motor rotor is excellent in the balance of rotation.

Moreover, in the invention, the inner cylindrical surface of the annular yoke is forcibly pressed with the forging die, so that the annular yoke is improved in circularity. Hence, the gap between the annular yoke and the hub cylindrical portion can be completely eliminated, and therefore the resultant motor rotor is improved in the balance of rotation. Furthermore, with the inner cylindrical surface of the annular yoke high in circularity as a reference surface, the machining operation is carried out. Hence, the hub manufacturing blank can be machined with high accuracy.

In addition, according to the manufacturing method of the invention, after the annular yoke is fitted in the hub by punching in the second forging step, the hub is finished. Accordingly, even if the hub is distorted when the annular yoke is fitted in the hub by punching, the distortion can be eliminated in the finishing step. Hence, in the manufacturing method, unlike the conventional one, it is unnecessary to provide the step of eliminating or correcting the distortion of the hub.

What is claimed is:

1. A method of manufacturing a motor rotor in which a yoke having an annular shape is fitted in a cylindrical portion of a hub, and a drive magnet is fitted in the yoke along an inner cylindrical surface of the yoke, comprising:

a first forging process comprising processing a die forging for a non-magnetic metal material to form a hub manufacturing primary blank which has the cylindrical portion, and first and second punching portions which are annular and with which the yoke can be fixed by punching; and a second forging process comprising processing a die forging for the primary blank to form a hub manufacturing secondary blank which is substantially similar to a final product, wherein, in said second forging process, with the yoke inserted into the cylindrical portion, the first and second punching portions are crushed with a forging die to fix the yoke by punching in such a manner that both whole edges of the yoke are sealingly closed by the first and second punching portions, and wherein said second forging process comprises increasing circularity of the yoke by forcibly pushing a part of the forging die in the yoke along the inner cylindrical surface of the yoke.

2. A method as claimed in claim 1, wherein, after said second forging process, the drive magnet is fitted in the yoke along the inner cylindrical surface of the yoke.

3. A method of manufacturing a motor rotor in which a yoke having an annular shape is fitted in a cylindrical portion of a hub, and a drive magnet is fitted in the yoke along an inner cylindrical surface of the yoke, comprising:

a first forging process comprising processing a die forging for a non-magnetic metal material to form a hub manufacturing primary blank which has the cylindrical portion, and first and second punching portions which are annular and with which the yoke can be fixed by punching; and a second forging process comprising processing a die forging for the primary blank to form a hub manufacturing secondary blank which is substantially similar to a final product, wherein, in said second forging process, with the yoke inserted into the cylindrical portion, the first and second punching portions are crushed with a forging die to fix the yoke by punching in such a manner that both whole edges of the yoke are sealingly closed by the first and second punching portions, and wherein, after said second forging process, finishing is performed by machining the secondary blank into the final product, and during the finishing, the inner cylindrical surface of the yoke is employed as a finishing reference surface.

4. A method as claimed in claim 3, wherein, after the finishing is performed, the drive magnet is fitted in the yoke along the inner cylindrical surface of the yoke.

5. A method as claimed in claim 3, further comprising holding the inner cylindrical surface of the yoke with a chuck during said machining.

* * * * *